United States Patent [19]

Orr et al.

[11] Patent Number: 4,757,481
[45] Date of Patent: Jul. 12, 1988

[54] METHOD AND SYSTEM FOR DETECTING WATER DEPTH AND PILOTING VESSELS

[75] Inventors: Edgar H. Orr, Cumming; Paul G. Steffes, Norcross, both of Ga.

[73] Assignee: Sea Scout Industries, Inc., Cumming, Ga.

[21] Appl. No.: 656,190

[22] Filed: Oct. 1, 1984

[51] Int. Cl.⁴ ...................... G01S 15/02; G01S 15/88; G01S 15/89
[52] U.S. Cl. ........................................ 367/96; 367/95
[58] Field of Search ................... 367/95, 96, 106, 131, 367/133, 134

[56] References Cited

U.S. PATENT DOCUMENTS

| | | | |
|---|---|---|---|
| 2,339,257 | 1/1944 | Embiricos et al. | 367/133 |
| 2,404,266 | 7/1946 | Loughnane | 340/61 |
| 3,656,095 | 4/1972 | Cavey | 367/96 |
| 3,922,630 | 11/1975 | Murphree | 367/96 |
| 3,922,632 | 11/1975 | Murphree | 367/96 |

*Primary Examiner*—John F. Terapane
*Assistant Examiner*—Eric Jorgensen

[57] ABSTRACT

The depth of water ahead of a vessel is detected by sonar means carried aboard a drone stationed by radio control ahead of the vessel. Detected depth information is transmitted from the drone to the vessel where it is displayed for use by the vessel pilot in navigating shallow waters.

11 Claims, 3 Drawing Sheets

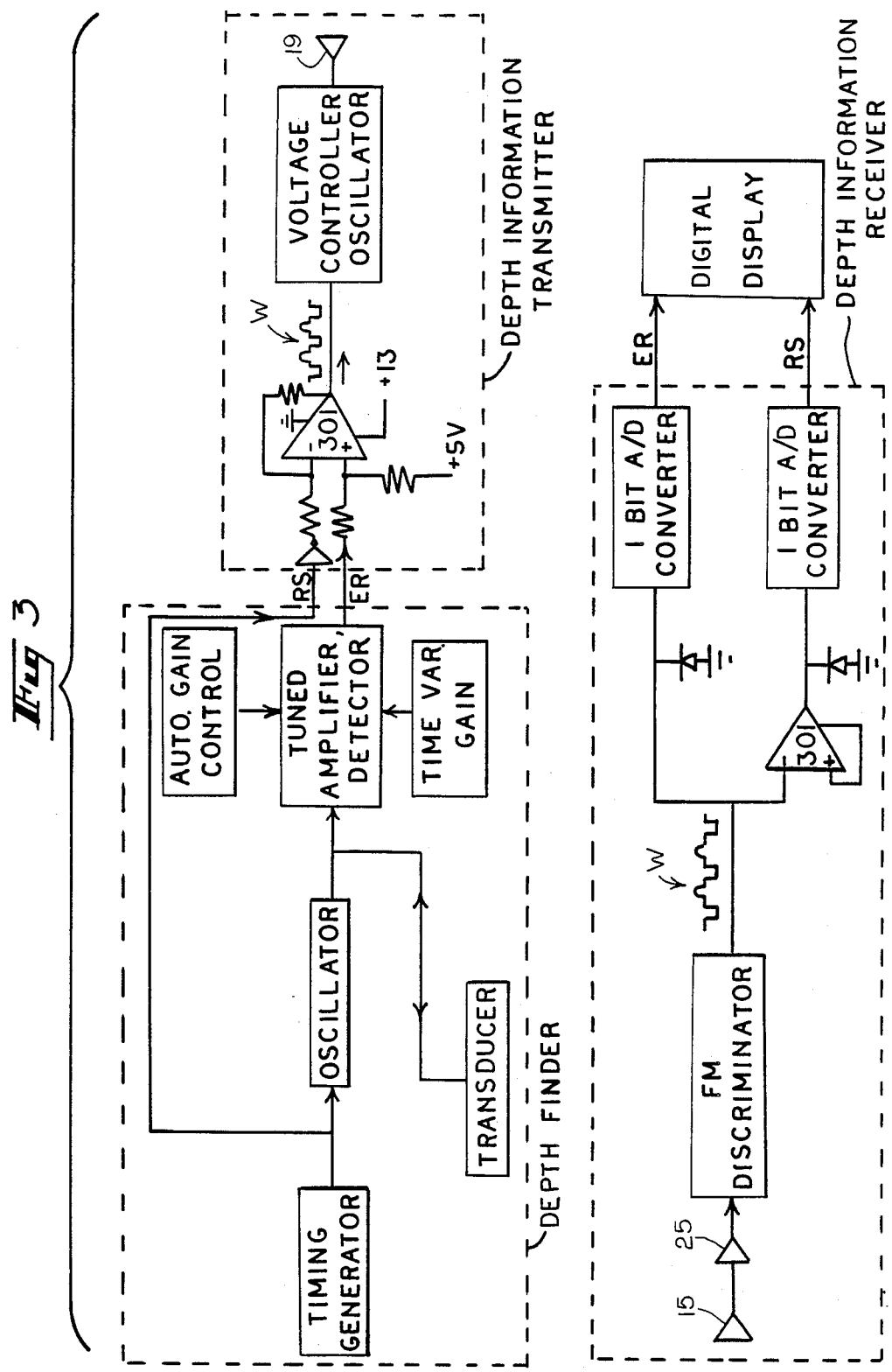

METHOD AND SYSTEM FOR DETECTING WATER DEPTH AND PILOTING VESSELS

TECHNICAL FIELD

This invention relates generally to methods of piloting vessels in shallow waters, and particularly to methods and systems for sensing the depth of waters ahead of vessels underway.

BACKGROUND OF THE INVENTION

Maritime vessels of various kinds must often navigate shallow waters. Visual observation is a principal technique relied upon in recognizing and steering clear of waters that are too shallow for ships to pass without risk of touching bottom or running aground. Visual observation, however, is an unreliable and limited technique. For example, the interplay of waves caused by surface winds, tides and changes in ambient lighting render it quite difficult for an observer on a ship consistently and reliably to identify waters ahead that are of insufficient depth to accomodate the vessel. This technique is also of little use at night. Other depth finding techniques include the use of plumb lines and sonar equipment. These apparatuses, however, only detect the depth of the water beneath the vessels themselves. Thus, in the event of encountering a rapid decrease in water depth, it is often too late for a pilot to arrest the movement of a vessel or to alter its course before it has encroached into unsafe waters. Where the vessel is under sail power it is even difficult to maintain a desired tack at speeds sufficiently slow for these types of methods. That all of these procedures normally require that vessels proceed slowly is in itself another limiting factor.

Accordingly, it is seen that a need exists and indeed has existed for many years for a method and system for detecting the depth of waters in the vicinity and particularly ahead of vessels underway, and for piloting vessels in shallow waters. It is to the provision of such methods and systems therefore that the present invention is primarily directed.

SUMMARY OF THE INVENTION

In one form of the invention a method of piloting a vessel comprises the steps of stationing a drone ahead of the vessel, sensing the depth of the water beneath the drone, transmitting sensed depth information from the drone to the vessel, and navigating the vessel along a course that is subject to changes as necessitated by the depth information received at the vessel from the drone.

In another form of the invention a method of detecting the depth of water in the vicinity of a vessel underway comprises the steps of deploying a drone of the type having radio receiver means operatively coupled with drone propulsion and guidance means, and maneuvering the drone by radio controlled signals transmitted from the vessel to the drone radio receiver means. Depth information signals are generated that are indicative of the depth of the water beneath the drone as sensed by sonar means carried aboard the vessel. The depth information signals are transmitted from the drone to the vessel where depth information derived from the depth information signals is displayed aboard the vessel.

In yet another form of the invention apparatus for detecting the depth of water in the vicinity of a vessel comprises a drone having propulsion and guidance means coupled by servo means with a drone radio receiver, and having depth finding means coupled with a drone radio transmitter. The system also comprises radio controlled transmitter means for transmitting control signals from the vessel to the drone radio receiver. The system further includes radio receiver means coupled with display means for receiving and displaying depth information aboard the vessel that is transmitted by the drone radio transmitter.

BRIEF DESCRIPTION OF THE DRAWING

FIG. 3 is a more detailed block diagram of components of the block diagram shown in FIG. 2.

DETAILED DESCRIPTION

Figure 1:
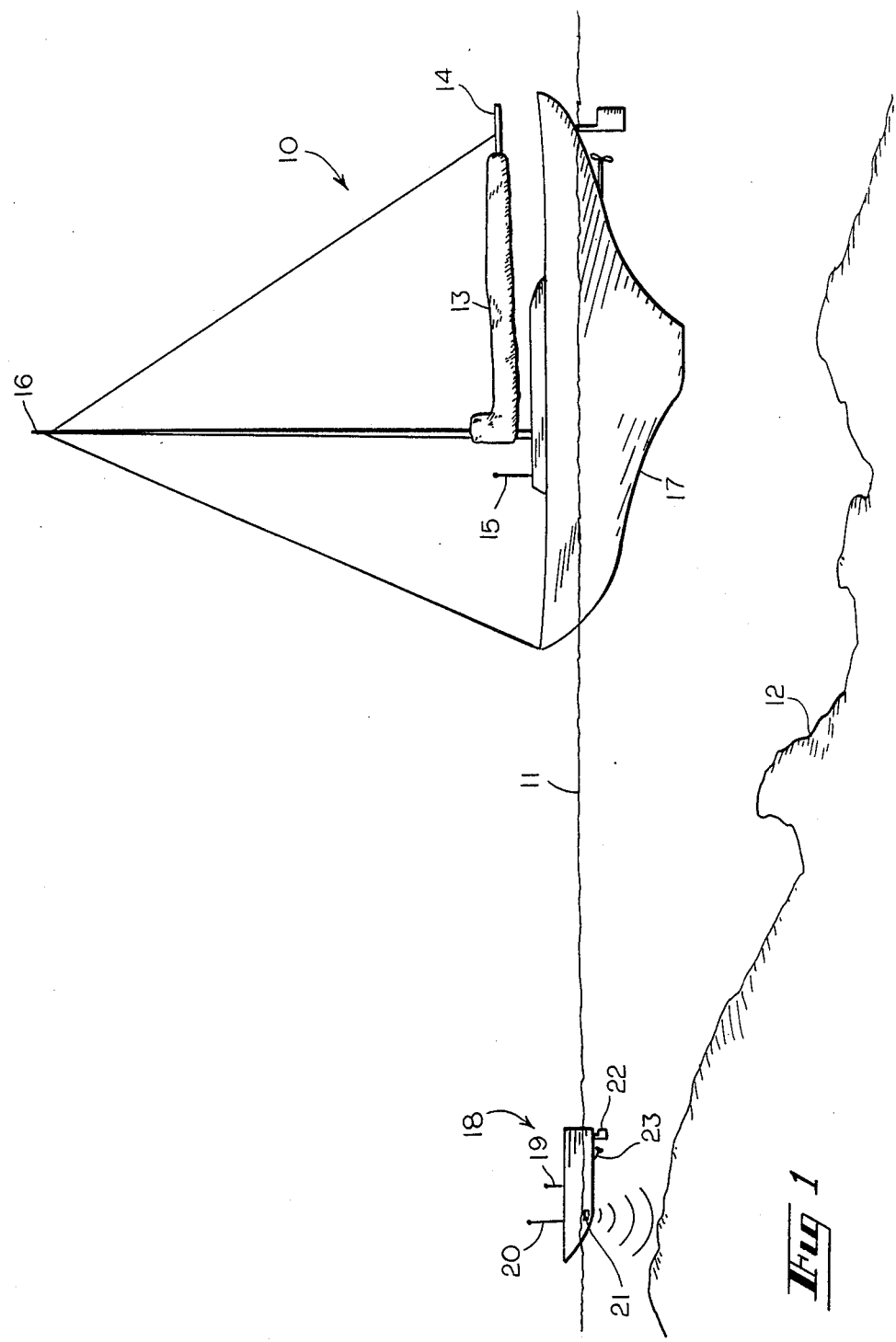
FIG. 1 is a diagrammatical view of a sailboat being piloted through shallow waters in accordance with principles of the present invention while utilizing a water depth detection system and method of the invention.

With reference next to FIG. 1, there is shown a sailboat 10 being piloted along the surface of a body of water 11 over an irregularly shaped sea floor 12 with its sail 13 stowed away upon boom 14. The sailboat has an antenna 15 which is coupled with a depth information receiver and another antenna 16 which is coupled with a radio control transmitter. A small drone 18 is seen to be stationed ahead of the sailboat along its intended course of travel. For conservation of illustration space the drone is shown much closer to the sailboat than it would actually be. The drone has an antenna 19 which is coupled with a depth information transmitter and another antenna 20 which is coupled with a radio control receiver. The depth information transmitter is connected to a depth finder 21 from which acoustical waves are emitted by sonar means down upon the sea floor beneath the drone, as shown. A drone radio control receiver is coupled to servo means that control a drone rudder 22 and a drone propeller 23.

From FIG. 1 it is seen that the depth finder 21 aboard the drone may detect that the sea floor beneath it is sufficiently shallow as to present the risk of the keel 17 of the sailboat 10 running aground at that point should the sailboat continue along its intended course, trailing the drone. However, since in accordance with the present invention the sensed depth information is transmitted to the sailboat 10, where it is displayed, the pilot of the sailboat may have sufficient time in which to change course so as to avoid this risk. In such event the pilot may slow or halt the sailboat and by radio control signals transmitted to the drone send it in search of sufficiently deep waters to permit the sailboat to continue in a desired general direction while avoiding waters that are too shallow. Once waters of sufficient depth have been detected by the drone and displayed aboard the sailboat the sailboat's course is altered accordingly and the drone restationed for continued pilotage. It thus is seen that the pilot has much latitude in his use, stationing and restationing of the drone. Periodic verification of a desired positioning of the drone may be made by visual observation which at night may be assisted by a lamp carried aboard the drone.

Figure 2:
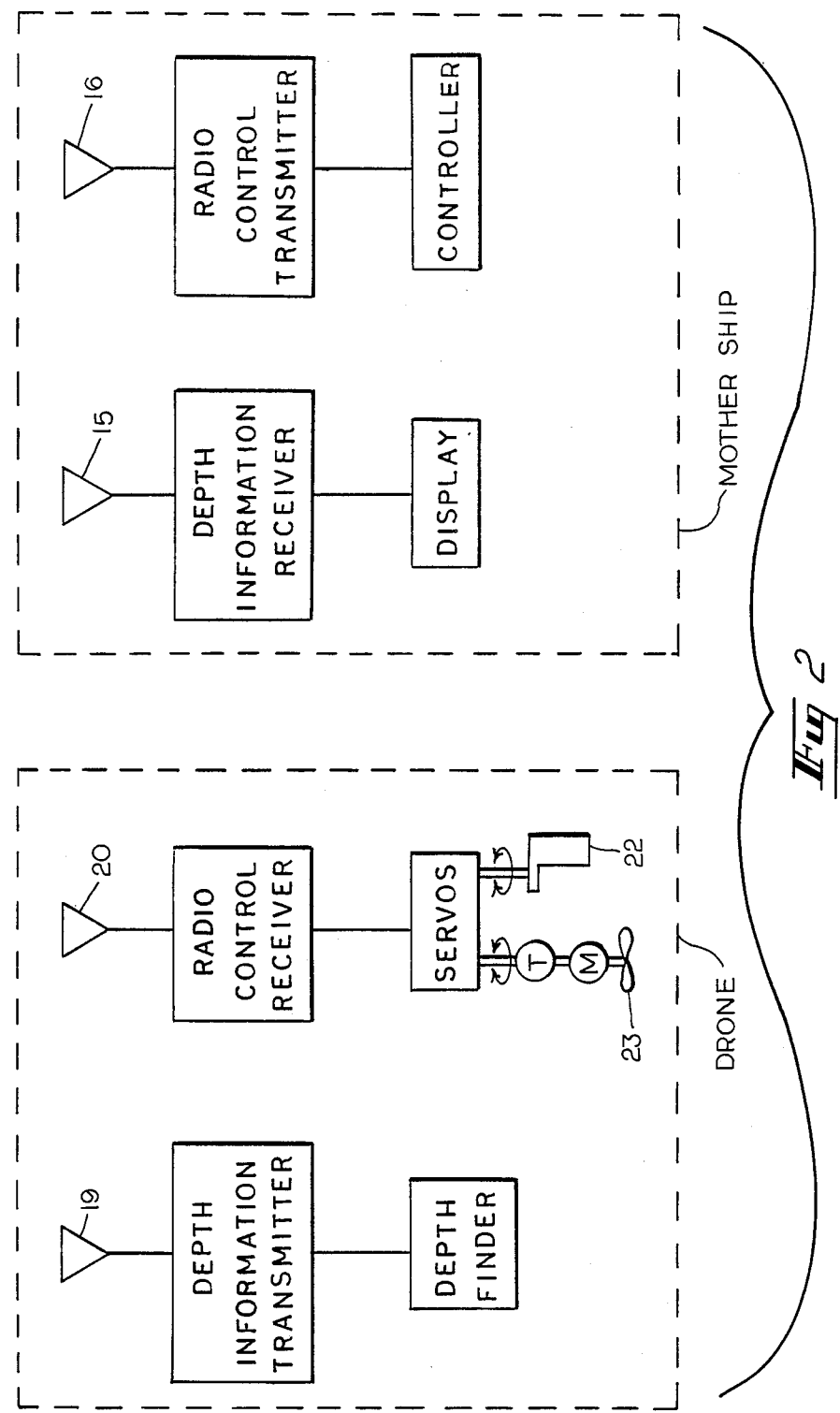
FIG. 2 is a block diagram of a system for detecting the depth of water in the vicinity of a vessel that embodies principles of the invention and which may be used in practicing a method of the invention.

With reference next to FIG. 2, the system components located on the drone 18 and those located on the sailboat or mother ship 10 are shown in block diagram form. Here it is seen that the drone antenna 19 is coupled with a depth information transmitter which itself is coupled with the depth finder 21. The receiving antenna 20 aboard the drone is seen to be coupled with the radio control receiver that controls servos which actuate the drone rudder 22 and which control the speed of the propeller 23 by movement of a throttle T of a propeller motor M. The sailboat or mother ship is seen to have its antenna 15 coupled with a depth information receiver which in turn is coupled with a display positioned for observation by the sailboat pilot. The antenna 16 aboard the sailboat is connected with a radio control transmitter which is coupled with a hand controller or "joy stick". Thus, FIG. 2 is seen to illustrate briefly the overall system and to identify which of the system components are aboard the mother ship and which are aboard the drone.

With reference next to FIG. 3 the depth finder aboard the drone is seen to include a timing generator which generates a periodic timing pulse at a frequency of, for example, 2.4 Hz. The timing pulses, which are labeled RS as an abbreviation for Reset Synchronization signal, is fed both to a power oscillator and to the depth information transmitter component of the system. Each time a timing signal RS is received by the power oscillator it is caused to emit an AC signal to an acoustoelectric transducer and to a amplifier and detector that is tuned to the oscillator frequency and which has blanking capability for ignoring the pulse transmitted directly to it from the oscillator. Upon receiving the AC signal the transducer is caused to emit an acoustic wave pulse down into the water beneath the drone. Once the acoustical wave strikes the sea floor an echo wave is generated and transmitted through the water back to the transducer which thereupon converts the acoustical wave energy to an AC electrical signal that is fed to the tuned amplifier, detector. The tuned amplifier, detector has an automatic gain control that prevents echo signals of excessive amplitude from damaging the detector. It also is seen to have a manually adjustable time variable gain control by which threshold levels may be adjusted to eliminate false echos such as those caused by schools of fish, unless, of course, the system is to be used to pilot a vessel to fish instead of away from shallows. The tuned amplifier and detector converts the detected AC signal to a digital signal, which is designated an ER signal as an abbreviation for Echo Received. The ER signal is transmitted to the depth information transmitter along with transmissions of the RS signal.

With continued reference to FIG. 3 it is seen that within the depth information transmitter aboard the drone the RS signal is inputted into a 301 type amplifier through a logic inverter and a balancing resistor. The ER signal is also inputted into the 301 through another balancing resistor. In this manner both signals are encoded into a single output signal. The waveform of this output signal is illustrated and is seen to have rounded, positive pulses between squared, negative pulses that are transmitted as a wavetrain to a voltage controlled oscillator. The VCO emits an FM signal at a frequency such as some 150 KHz. The combined RS and ER signal wavetrain is encoded by frequency modulation onto an RF carrier wave and radiated from a small antenna.

With continued reference to FIG. 3, the depth information receiver aboard the mother ship is seen to include the antenna 15 which is coupled through a limiting amplifier 25 to a conventional FM discriminator which detects the same waveform by effectively eliminating the carrier signal transmitted by the data information transmitter. This signal is transmitted to an inverting amplifier comprised of a 301 type amplifier and two 1-bit analog to digital converters. Diodes are provided to render each signal unipolar and thus back to separated original RS and ER signals. The individual ER and RS signals are inputted into a digital display such as that which forms a part of the Pacifica digital sounder sold by Datamarine International, Inc. The digital display calculates the depth of the water detected by the length of time the acoustical waves take in going from the transducer to the sea floor and back, and then displays the depth information upon a display screen. The digital display is of conventional construction and may also be that provided by the Pacifica digital sounder sold by Datamarine International, Inc. Alternatively, an audio and/or visual alarm may be substituted for the digital display as an equilivent element of the system.

As just stated the depth information transmitted from the drone to the mother ship includes both the reset sync signal and the echo received signal rather than a signal that indicates a calculated depth. This serves to minimize the power source requirements aboard the drone itself and to enhance compactness and weight limitation of the electronic equipment aboard the drone. Of more importance perhaps is that this transmission technique, utilizing pulse spacing modulation for the encoding of the depth data, is successfully transmitted by low power since the pulse spacing is recognized by the depth information receiver aboard the mother ship. Conversely, were standard digital codes such as ASCII used for encoding the depth data, a higher powered transmitter would be required for the drone to avoid transmission errors.

The radio control transmitter and controller aboard the mother ship is conventional. For example, it may be a NET-CL126HM type transmitter and manual controller portion of a remote controller model D6C-45HM sold by the Japan Remote Control Company, Ltd. The radio control receiver aboard the drone may be a type NER226 portion of the same D6C-45HM remote controller. The radio control receiver output signals are transmited to two electromechanical servos. One servo is mechanically linked to the throttle of a DC motor, such as a Dumus 2005 motor, which is directly coupled with a propeller 23. The other servo is mechanically coupled to the drone rudder 22.

It thus is seen that a method and system is provided for determining the depth of waters ahead of a vessel underway which will provide the pilot of the vessel with sufficient time to avoid waters of unsafe depth. By utilizing the drone and by controlling its station and by restationing it, a new system of piloting itself has also been provided. Though the system is primarily intended for use in avoiding running aground it obviously can also be used to navigate toward shallows or to schools of fish. Though the preferred embodiment has been described in detail it should be understood that modifications, additions and deletions may be made thereto without departure from the spirit and scope of the invention as set forth in the following claims.

We claim:

1. A method of piloting a vessel comprising the steps of:
   (a) stationing a drone ahead of the vessel;
   (b) sensing the depth of the water beneath the drone;

(c) transmitting sensed depth information from the drone to the vessel; and (d) navigating the vessel along a course that is subject to changes as necessitated by depth information received at the vessel from the drone.

2. The piloting method of claim 1 wherein step (a) the drone is stationed by radio control from the vessel.

3. The piloting method of claim 2 wherein the station of the drone relative to the vessel is altered from time to time by radio control.

4. The piloting method of claim 1 wherein maintenance of the desired drone station is verified by observation from the vessel.

5. The piloting method of claim 1 wherein step (b) the water depth is sensed by sound waves generated and detected aboard the drone.

6. A method of detecting the depth of water in the vicinity of a vessel underway comprising the steps of:

(a) deploying from the vessel a drone of the type having radio receiver means operatively coupled with drone propulsion and guidance means;

(b) maneuvering the drone by radio control signals transmitted from the vessel to the drone radio receiver means;

(c) generating depth information signals indicative of the depths of the water beneath the drone sensed by sonar means carried aboard the drone;

(d) transmitting the depth information signals from the drone to the vessel; and, (e) displaying depth information aboard the vessel derived from the depth information signals received from the drone.

7. The depth detecting method of claim 6 wherein step (c) an electrical timing signal is repeatedly generated and transmitted to an oscillator coupled with an acoustoelectric transducer by the sonar means, and wherein step (d) said timing signal is repeatedly transmitted to the vessel.

8. The depth detecting method of claim 6 wherein step (d) timing signals and detected echo response signals are transmitted from the drone to the vessel.

9. A system for detecting the depth of water in the vicinity of a vessel comprising a drone having propulsion and guidance means coupled by servo means with a drone radio receiver and having depth finding means coupled with a drone radio transmitter; radio control transmitter means for transmitting control signals from the vessel to the drone radio receiver; and radio receiver means coupled with display means for receiving and displaying depth information aboard the vessel transmitted by said drone radio transmitter.

10. The depth detection system of claim 9 wherein said depth finding means comprises a timing signal generator coupled with said drone radio transmitter for transmission to said radio receiver means and also coupled with acoustoelectric transducer means.

11. The depth detection system of claim 10 wherein said radio receiver means includes inverting amplifier means coupled with an FM discriminator for separating timing signals and echo signals transmitted by said drone radio transmitter.

* * * * *